US009237452B2

(12) United States Patent
Lee et al.

(10) Patent No.: US 9,237,452 B2
(45) Date of Patent: Jan. 12, 2016

(54) METHOD OF AVOIDING IDC INTERFERENCE IN A WIRELESS COMMUNICATION SYSTEM AND APPARATUS FOR SAME (75) Inventors: Jaewook Lee, Anyang-si (KR); Sungduck Chun, Anyang-si (KR); Seungjune Yi, Anyang-si (KR); Sunghoon Jung, Anyang-si (KR); Youngdae Lee, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 13/704,204

(22) PCT Filed: Aug. 10, 2011

(86) PCT No.: PCT/KR2011/005829
§ 371 (c)(1),
(2), (4) Date: Dec. 13, 2012

(87) PCT Pub. No.: WO2012/023734
PCT Pub. Date: Feb. 23, 2012

(65) Prior Publication Data
US 2013/0090142 A1    Apr. 11, 2013

Related U.S. Application Data (60) Provisional application No. 61/374,236, filed on Aug. 16, 2010, provisional application No. 61/394,742, filed on Oct. 19, 2010.

(51) Int. Cl.
*H04B 17/00*       (2015.01)
*H04W 16/14*      (2009.01)
(Continued)

(52) U.S. Cl.
CPC ............. *H04W 16/14* (2013.01); *H04B 1/0475* (2013.01); *H04B 1/12* (2013.01); *H04W 24/04* (2013.01); *H04W 72/082* (2013.01)

(58) Field of Classification Search
USPC ................... 455/63.1, 67.11, 67.13, 446–454
See application file for complete search history.

(56) References Cited

U.S. PATENT DOCUMENTS 8,737,924 B2 *   5/2014   Fu et al. ................... 455/63.1
2010/0061326 A1    3/2010   Lee et al.
(Continued)

FOREIGN PATENT DOCUMENTS

JP    2007-312274 A    11/2007

OTHER PUBLICATIONS

CMCC, "Kickoff for SI on interference avoidance for in-device coexistence," 3GPP TSG-RAN WG2 meeting #70bis, R2-103949, Stockholm, Sweden, Jun. 28-Jul. 2, 2010, 4 pages.
(Continued)

*Primary Examiner* — Fayyaz Alam
(74) *Attorney, Agent, or Firm* — Birch, Stewart, Kolasch & Birch, LLP (57) ABSTRACT Disclosed is a method of transmitting, by a terminal, IDC (In-Device Coexistence) interference information to a base station, according to the present invention. Specifically, the invention comprises the steps of: receiving quality measurement configuration information from the base station; measuring quality using the information when operations of one or more second communication modules coexisting in the terminal are sensed; setting a frequency used in the measuring quality as a disabled frequency due to the IDC interference when the measured quality is less than a threshold value; and transmitting information about the disabled frequency to the base station.

18 Claims, 8 Drawing Sheets (51) Int. Cl.
*H04B 1/04* (2006.01)
*H04B 1/12* (2006.01)
*H04W 24/04* (2009.01)
*H04W 72/08* (2009.01)

(56) References Cited

U.S. PATENT DOCUMENTS

| 2012/0040620 A1* | 2/2012 | Fu et al. ....................... 455/63.1 |
| 2012/0195298 A1* | 8/2012 | Kuo ............................... 370/338 |
| 2013/0029704 A1* | 1/2013 | Koo et al. ...................... 455/501 |
| 2014/0235175 A1* | 8/2014 | Fu et al. ....................... 455/63.1 |

OTHER PUBLICATIONS

Ericsson et al., "Methods for WLAN/Bluetooth in-device coexistence interference avoidance," 3GPP TSG-RAN WG2 #70bis, Tdoc R2-103900, Stockholm, Sweden, Jun. 28-Jul. 2, 2010, 3 pages.

Media Tek, "Discussion on In-device Coexistence Interference Avoidance," 3GPP TSG-RAN WG2 Meeting #70bis, R2-103644, Stockholm, Sweden, Jun. 28-Jul. 2, 2010, 3 pages.

Qualcomm, "RRM Analysis for In-device coexistence," 3GPP TSG-RAN WG2 Meeting #70bis, R2-103785, Stockholm, Sweden, Jun. 28-Jul. 2, 2010, 3 pages.

\* cited by examiner

(a) CONTROL-PLANE PROTOCOL STACK (b) USER-PLANE PROTOCOL STACK

# METHOD OF AVOIDING IDC INTERFERENCE IN A WIRELESS COMMUNICATION SYSTEM AND APPARATUS FOR SAME

This application is the National Phase of PCT/KR 2011/005829 filed on Aug. 10, 2011, which claims priority under 35 U.S.C. 119(e) to US Provisional Application Nos. 61/374,236 filed on Aug. 16, 2010 and 61/394,742 filed on Oct. 19, 2010, all of which are hereby expressly incorporated by reference into the present application.

TECHNICAL FIELD

The present invention relates to a wireless communication system, and more particularly, to a method of avoiding In-Device Coexistence (IDC) interference in a wireless communication system and an apparatus for the same.

BACKGROUND ART

As an example of a wireless communication system to which the present invention is applicable, a 3$^{rd}$ Generation Partnership Project (3GPP) Long Term Evolution (LTE) communication system will be schematically described.

Figure 1:
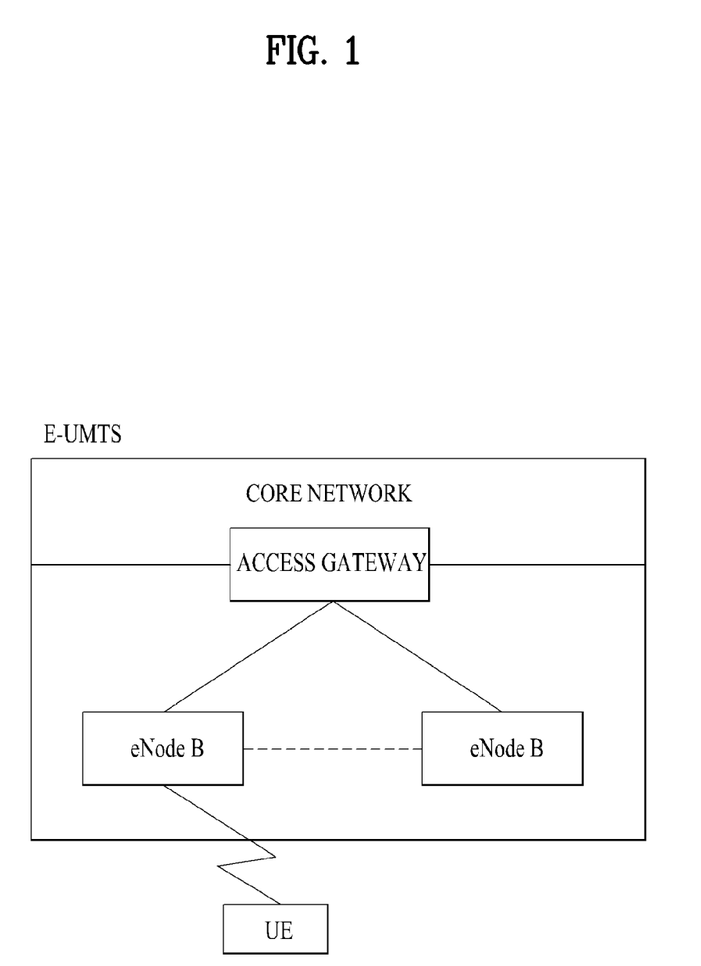
FIG. 1 is a diagram showing a network structure of an Evolved Universal Mobile Telecommunications System (E-UMTS) as an example of a wireless communication system.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3$^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention is to provide a method of avoiding In-Device Coexistence (IDC) interference in a wireless communication system and an apparatus for the same.

Technical Solution

The object of the present invention can be achieved by providing a method of transmitting In-Device Coexistence (IDC) interference information from a first communication module of a user equipment (UE) to a base station in a wireless communication system, the method including: receiving quality measurement configuration information from the base station; performing quality measurement using the quality measurement configuration information if operation of one or more second communication modules coexisting in the UE is detected; setting a frequency used in the quality measurement to an unusable frequency due to IDC interference if the measured quality is equal to or less than a threshold; and transmitting information about the unusable frequency to the base station.

In another aspect of the present invention, there is provided a user equipment (UE) in a wireless communication system, the UE including: a first communication module configured to transmit and receive a signal to and from a first communication system; and one or more second communication modules configured to transmit and receive a signal to and from another communication system, wherein the first communication module receives quality measurement configuration information from a base station, performs quality measurement using the quality measurement configuration information if operation of one or more second communication modules coexisting in the UE is detected, sets a frequency of the quality measurement to an unusable frequency due to IDC interference if the measured quality is equal to or less than a threshold, and transmits information about the unusable frequency to the base station.

The unusable frequency may be a serving frequency or non-serving frequency between the first communication module and the base station. The operation of the one or more second communication modules may be operation for turning the one or more second communication modules on or traffic transmission/reception operation of the one or more second communication modules.

A frequency band corresponding to the first communication module and a frequency band corresponding to the one or more second communication modules may be adjacent to each other by a predetermined value or less. The one or more second communication modules may include at least one of a transmission/reception module for a Wi-Fi system, a Bluetooth transmission/reception module and a global positioning system (GPS) reception module.

The first communication module may be in a radio resource control (RRC)_CONNECTED state with the base station.

Advantageous Effects

According to the embodiments of the present invention, a user equipment (UE) can efficiently avoid IDC interference.

The effects of the present invention are not limited to the above-described effects and other effects which are not described herein will become apparent to those skilled in the art from the following description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 2:
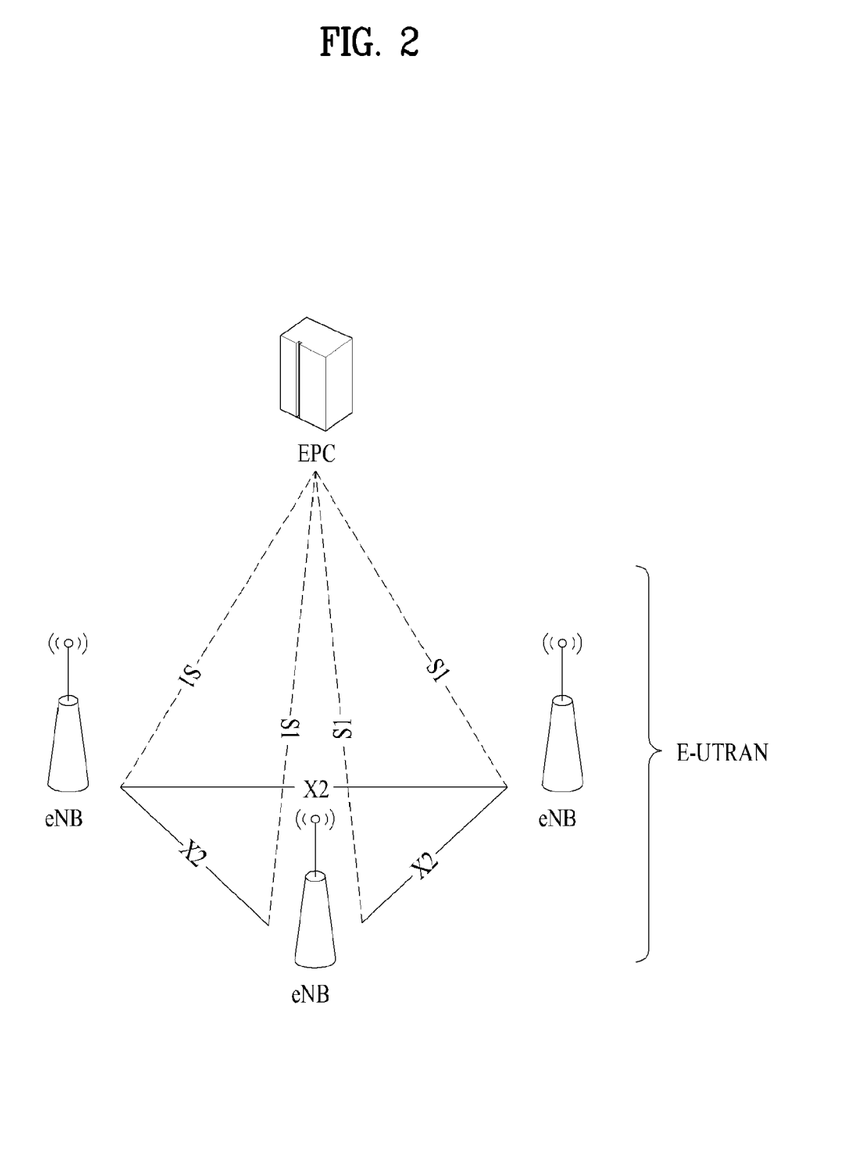
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes eNBs and eNBs are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
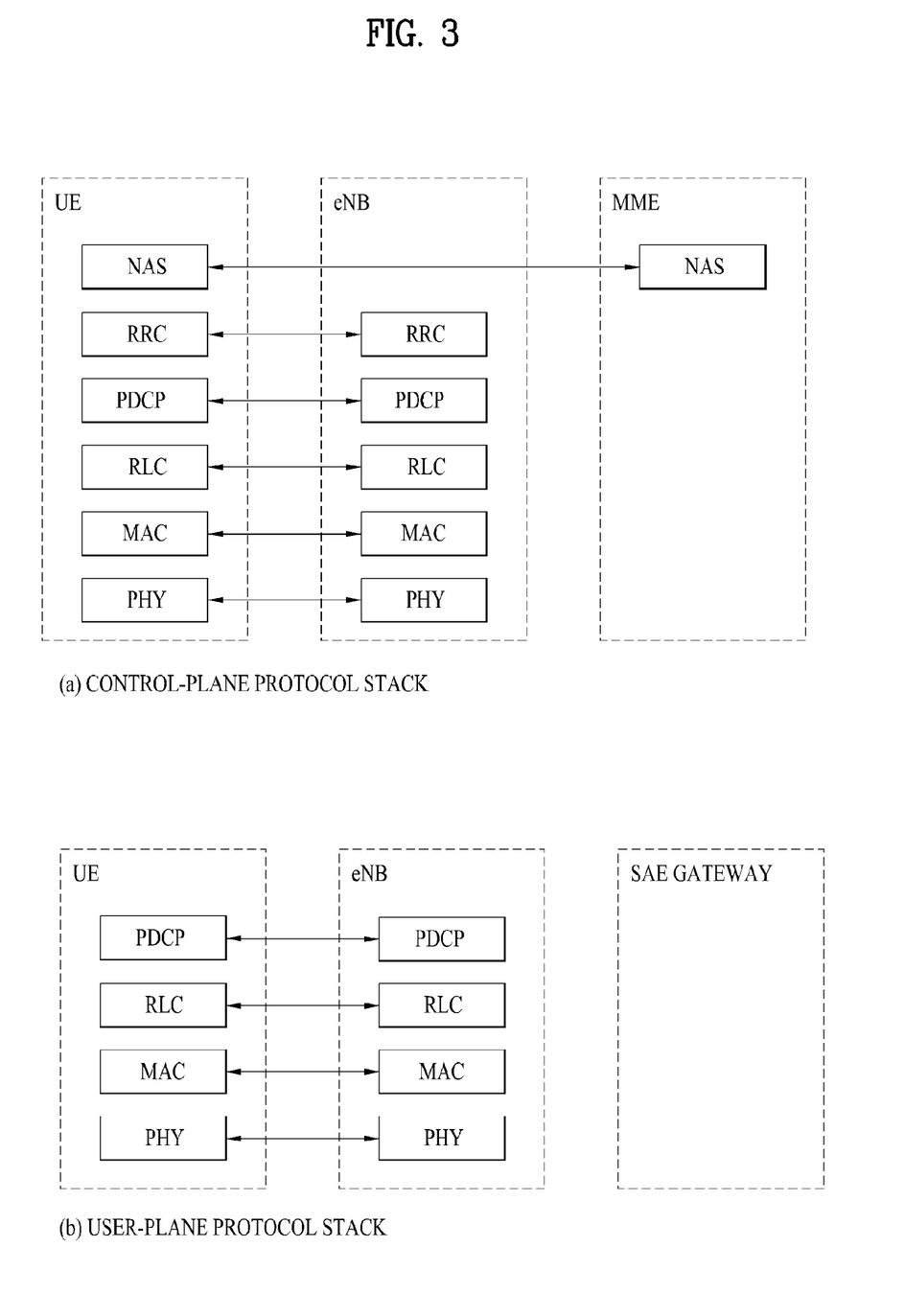
FIG. 3 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Hereinafter, an RRC state of a UE and an RRC connection method will be described. The RRC state indicates whether the RRC layer of the UE is logically connected to the RRC layer of the E-UTRAN, is referred to as an RRC_CONNECTED state if connected, and is referred to as an RRC_IDLE state if not connected.

Since the E-UTRAN can check presence of the UE of the RRC_CONNECTED state in cell units, it is possible to efficiently control the UE. In contrast, the E-UTRAN cannot check presence of a UE of the RRC_IDLE state and a core network (CN) manages the UE of the RRC_IDLE state in a tracking area (TA) unit which is greater than a cell. That is, the RRC_IDLE state of the UE should transition to the RRC_CONNECTED state in order to receive a service, such as voice or data.

In particular, when a user initially powers a UE on, the UE first searches for an appropriate cell and camps on the cell in an RRC_IDLE state. When RRC connection needs to be established, the UE which is in the RRC_IDLE state is RRC connected to the E-UTRAN via an RRC connection establishment procedure so as to transition to the RRC_CONNECTED state. For example, if uplink data transmission is necessary due to call connection attempt of a user or if a response message is transmitted in response to a paging message received from the E-UTRAN, the UE which is in the idle state needs to be RRC connected to the E-UTRAN.

Now, measurement and measurement report will be described.

In the following description, "measurement" indicates that a UE receives reference signals from inter-frequency, intra-frequency and inter-RAT cells according to measurement settings received from a network and measures quality values of corresponding cells. In the following description, "quality" refers to signal quality or cell quality which is checked via a reference signal received from a cell to be measured.

In a mobile communication system, in association with UE mobility support, the UE measures quality of a serving cell which currently provides a service and quality of a neighboring cell at least in a discontinuous reception (DRX) cycle. The UE reports a cell quality measurement result to a network at an appropriate time and the network provides optimal mobility to the UE via handover.

A UE may perform measurement for a special purpose set by a network and report a cell quality measurement result to the network, in order to provide information which aids a provider in managing a network, in addition to the purpose of supporting mobility. For example, a UE receives broadcast information of a specific cell set by a network. The UE may report a cell identity (also referred to as a global cell identity) of the specific cell, location identification (e.g., tracking area code) of the specific cell and/or other cell information (e.g., member of a closed subscriber group (CSG)) to a serving cell.

If a UE which is moving determines that the quality of a specific region is very bad through measurement, it is possible to report location information of cells having bad quality and a cell quality measurement result to a network. The network may be optimized based on the report of the cell quality measurement result of UEs which aid in network management.

In a mobile communication system in which a frequency reuse factor is 1, a UE mostly moves between different cells having the same frequency band. Accordingly, in order to guarantee mobility of the UE, the UE should measure quality of peripheral cells having the same center frequency as the center frequency of a serving cell and cell information well. Measurement of the cell having the same center frequency as the center frequency of the serving cell is referred to as intra-frequency measurement. The UE performs intra-frequency measurement and reports a cell quality measurement result to a network at an appropriate time, thereby achieving the purpose of the cell quality measurement result.

A mobile communication provider may manage a network using a plurality of frequency bands. If a service of a communication system is provided via a plurality of frequency bands, in order to guarantee optimal mobility of a UE, the UE should measure quality of peripheral cells having center frequencies different from the center frequency of the serving cell and cell information well. Measurement of a cell having a center frequency different from the center frequency of the serving cell is referred to as inter-frequency measurement. The UE performs inter-frequency measurement and reports a cell quality measurement result to a network at an appropriate time.

If the UE supports measurement of a heterogeneous network, measurement of a cell of the heterogeneous network may be performed by settings of eNB. Measurement of the heterogeneous network is referred to as inter-radio access technology (RAT) measurement. For example, RAT may include a UMTS terrestrial radio access network (UTRAN) and a GSM EDGE radio access network (GERAN) which follow the 3GPP standard and may also include a CDMA 2000 system which follows the 3GPP2 standard.

Hereinafter, In-Device Coexistence (IDC) and IDC interference will be described.

In order to enable a user to access various networks anywhere and at anytime, a global navigation satellite system (GNSS) receiver including transmitters/receivers for wireless communication systems such as LTE, Wi-Fi and Bluetooth (BT) needs to be mounted in one UE. Coexistence of different wireless communication systems in one UE is referred to as In-Device Coexistence (IDC). For example, there are a UE including an LTE module and a BT module for receiving a VoIP service and a multimedia service using a BT earphone, a UE including an LTE module and a Wi-Fi module for traffic distribution, and a UE including a GNSS module and an LTE module for additionally acquiring position information.

Figure 4:
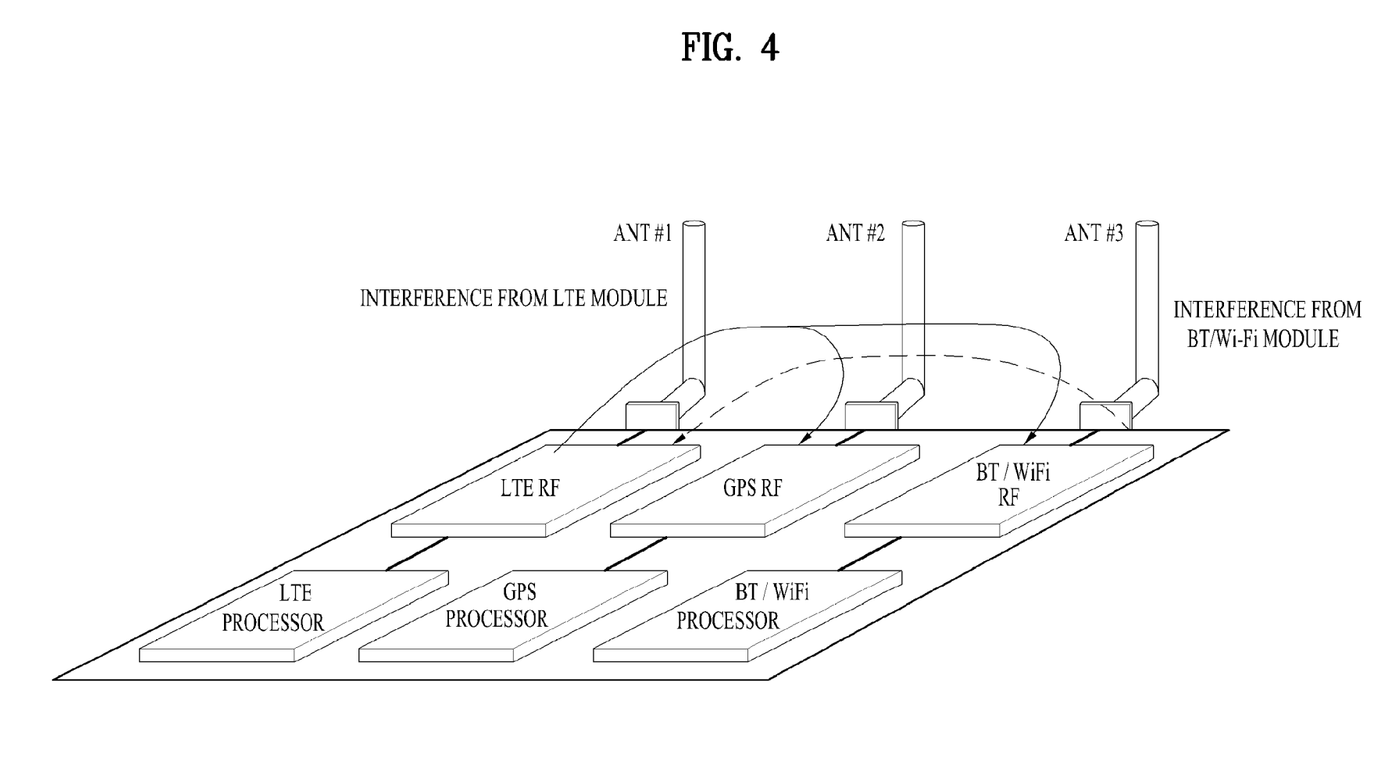
FIG. 4 is a diagram showing a UE including wireless communication modules for an LTE system, a global positioning system (GPS) and a BT/Wi-Fi system.

FIG. 4 is a diagram showing a UE including wireless communication modules for an LTE system, a global positioning system (GPS) and a BT/Wi-Fi system.

Referring to FIG. 4, since several transmitters/receivers are adjacently located in the UE, power of a signal transmitted by one transmitter may be greater than power of a signal received by another receiver. In this case, interference may occur between different communication modules and is referred to as IDC interference. If IDC interference becomes severe, a ping-pong phenomenon in which handover is continuously attempted occurs although there is no problem in connection with a base station (BS).

In general, the communication modules operate at adjacent frequencies as follows and thus may mutually cause interference.

An LTE module may operate at TDD band 40 (2300 MHz to 2400 MHz) and a Wi-Fi module or a Bluetooth module may operate at an unlicensed band of 2400 MHz to 2483.5 MHz. In this case, transmission of the LTE module may provide interference to the Wi-Fi module or the Bluetooth module or transmission of the Wi-Fi module or the Bluetooth module may provide interference to reception of the LTE module.

In addition, the LTE module may perform uplink transmission at FDD band 7 (2500 MHz to 2700 MHz) and the Bluetooth module may operate at 2400 MHz to 2483.5 MHz which is an unlicensed band. In this case, uplink transmission of the LTE module may provide interference to reception of the Wi-Fi module or the Bluetooth module.

In addition, the LTE module may operate at FDD band 13 (UL: 777 to 787 MHz, DL: 746 to 756 MHz) or FDD band 14 (UL: 788 to 798 MHz, DL: 758 to 768 MHz) and the GPS module may receive position information at 1575.42 MHz. In this case, uplink transmission of the LTE module may provide interference to position information reception of the GPS module.

In order to solve this problem, a physical filter is provided or a spacing between transmitted and received signals is sufficiently ensured, thereby preventing IDC interference between a transmitter and a receiver. However, if several wireless communication modules operate at adjacent frequencies, it is difficult to sufficiently suppress interference using a current filter technique.

Independently of the method of applying a physical filter, an IDC interference avoidance method may take the following three cases into account depending on whether coordination with another communication module coexisting with an LTE module is performed and whether coordination for eliminating IDC interference between an LTE module and a BS is performed.

First, no coordination is performed between communication modules which coexist in one UE and between an LTE module and a BS in order to avoid IDC interference. In this case, the LTE module is not aware of information about another coexisting communication module.

Second, coordination is only performed between communication modules which coexist in a UE. In this case, a UE may be aware of an operation state (that is, ON/OFF state) between coexisting modules, a traffic transmission state, etc.

Finally, coordination is performed between communication modules which coexist in one UE and between a UE and a BS. The LTE module may measure IDC interference through measurement as well as coordination with another module. In this case, the UE may become aware of an operation state between coexisting modules, a traffic transmission state, etc. and may inform the BS of the IDC interference state so as to enable the BS to avoid IDC interference.

Currently, in 3GPP, in order to solve IDC interference, 1) a method of changing a frequency at a communication module which provides interference or a communication module which receives interference (frequency division multiplexing; FDM), 2) a method of dividing and using a time at communication modules sharing one frequency (time division multiplexing; TDM) and 3) a method of, at an LTE module, adjusting transmit power so as to reduce interference with another coexisting module is taken into account and a detailed method and procedure is currently being discussed in 3GPP.

As described above, there is a need for cooperation of a BS in order to efficiently perform the above-described IDC interference control method. That is, there is a need for cooperation such as handover for changing a used frequency to another frequency in order to avoid IDC interference, scheduling of a BS for dividing and using time resources, etc. However, since IDC interference occurs in one UE, the BS may not be aware of IDC interference occurring in the UE. Since the BS does not recognize IDC interference occurring in the UE and thus does not take appropriate measures, Quality of Service (QoS) of a service which uses an LTE system or another coexisting communication system may be severely deteriorated. Therefore, in order to enable the BS to take appropriate measures against IDC interference occurring in the UE, the UE needs to inform the BS of IDC interference information.

Accordingly, in the present invention, the case in which interference occurs in an LTE transmitter/receiver or the case in which interference is expected to occur in an LTE transmitter/receiver will be described as a method of avoiding interference occurring when an LTE transmitter/receiver and another communication transmitter/receiver simultaneously operate in one UE. As detailed interference avoidance methods, the following four embodiments are proposed.

<First Embodiment>

A first embodiment of the present invention relates to the case in which only coordination between communication modules coexisting in a UE is performed and is characterized in that, if mutual interference is expected to occur due to coexistence between an LTE module and another communication module in the UE, unusable frequencies are excluded when establishing RRC connection with a BS.

The unusable frequencies may be defined as frequencies of an LTE system which may provide interference to another communication module due to operation of the LTE module or frequencies enabling the LTE module to receive interference when another communication module operates. In this case, assume that the LTE module is aware of existence of another coexisting communication module or is aware of unusable frequencies due to the coexisting communication module. Accordingly, if the frequency of the LTE module and the frequency of another communication module are adjacent to each other by a predetermined threshold or less, it is expected that the LTE module generates interference.

Figure 5:
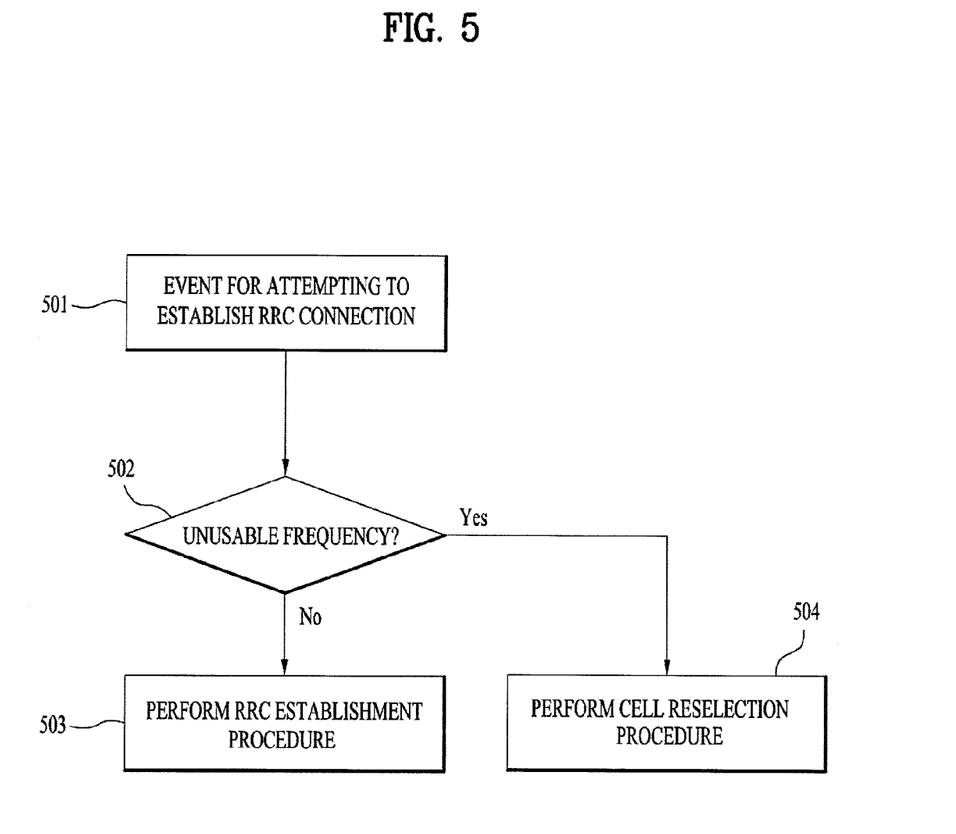
FIG. 5 is a flowchart illustrating a method of avoiding IDC interference according to a first embodiment of the present invention.

FIG. 5 is a flowchart illustrating a method of avoiding IDC interference according to a first embodiment of the present invention.

Referring to FIG. 5, if an event in which the LTE module attempts to establish RRC connection with the BS occurs in step 501, the LTE module checks whether the system frequency of the LTE module in an RRC_IDLE state is an unusable frequency in step 502.

In this case, if the system frequency is not the unusable frequency, the LTE module performs an RRC connection procedure with the BS in step 503. However, if the system frequency is the unusable frequency, the LTE module reselects a cell having a new system frequency different from the unusable frequency and performs the RRC connection procedure with the cell in step 504.

<Second Embodiment>

A second embodiment of the present invention relates to the case in which coordination between coexisting modules in a UE and coordination between the UE and a BS are performed and is characterized in that, if mutual interference is expected to occur due to coexistence between an LTE module and another communication module in the UE, capability information of the coexisting system is transmitted to the BS such that the BS confirms potential interference of the UE.

More specifically, the LTE module in the RRC_IDLE state transmits capability information of the UE to the BS when initially establishing RRC connection with the BS such that the BS confirms IDC interference of the UE which may occur later. In this case, if the frequencies used by the LTE module and another communication module are adjacent to each other by a predetermined threshold or less, the BS expects that the LTE module generates interference.

In addition, the LTE module may add information about a communication module or a communication system, a frequency used by a coexisting communication system, unusable frequencies, etc. to a message for transmitting the capability information "UECapabilityInformation" or define a new message. The unusable frequencies may be defined as frequencies of an LTE system which may provide interference to another communication module due to operation of the LTE module or frequencies enabling the LTE module to receive interference when another communication module operates, similarly to the first embodiment.

<Third Embodiment>

A third embodiment of the present invention relates to the case in which coordination between coexisting modules in a UE and coordination between the UE and a BS are performed and is characterized in that, if mutual interference is expected to occur due to coexistence between an LTE module and another communication module in the UE, information as to whether another communication module operates is transmitted to the BS.

If a communication module of another coexisting system operates (that is, transitions to an ON state) or if traffic transmission starts in a state in which the frequencies used by the LTE module in the RRC_CONNECTED state and another communication module are adjacent to each other by a threshold or less, the LTE module expects that interference occurs due to coexistence with another system.

Information as to whether another communication module operates may include information about coexisting communication modules or communication systems, frequencies used by coexisting communication modules, unusable frequencies, etc. The unusable frequencies may be defined serving frequencies or non-serving frequencies of an LTE system which may provide interference to another communication module due to operation of the LTE module or frequencies enabling the LTE module to receive interference from another communication module.

<Fourth Embodiment>

A fourth embodiment of the present invention relates to the case in which IDC interference actually occurs due to coexistence of an LTE module in an RRC_CONNECTED state and another communication module and is characterized in that, if coordination between coexisting modules in a UE and coordination between the UE and a BS are performed, information about unusable frequencies which may not be used by the LTE module in the RRC_CONNECTED state due to IDC interference is transmitted to the BS.

The unusable frequencies of the fourth embodiment may be defined as serving frequencies or non-serving frequencies of the LTE system in which severe interference of a predetermined threshold or more currently occurs due to traffic transmission of another coexisting system or frequencies of the LTE system which currently cause interference of a predetermined threshold or more in another communication module due to operation of the LTE module. Information about the unusable frequencies may be added to the existing measurement result report message or a new message may be defined and transmitted to the BS.

Figure 6:
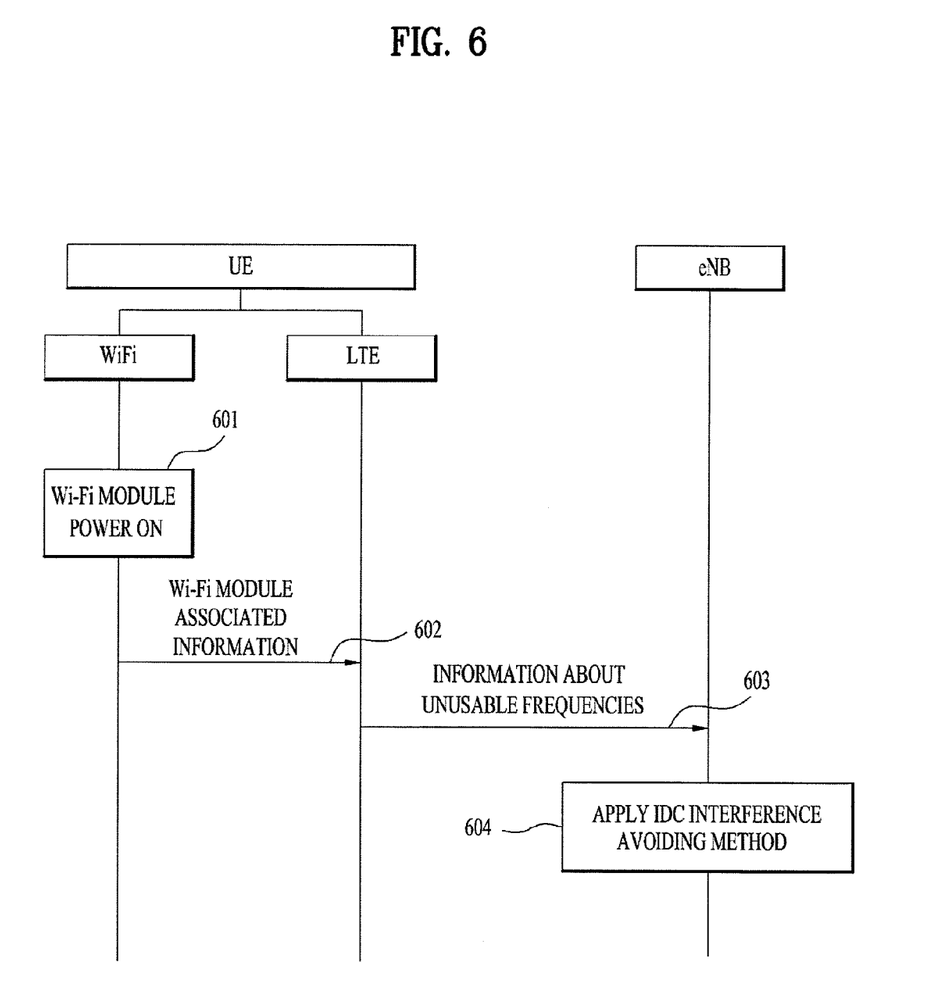
FIG. 6 is a flowchart illustrating a method of avoiding IDC interference according to a fourth embodiment of the present invention.

FIG. 6 is a flowchart illustrating a method of avoiding IDC interference according to a fourth embodiment of the present invention. In particular, FIG. 6 shows an example in which a Wi-Fi module and an LTE module operate at adjacent frequencies in one UE. In addition, assume that IDC interference can be detected through coordination between the Wi-Fi module and the LTE module.

Referring to FIG. 6, if the Wi-Fi module is powered on in step 601, the UE regards IDC interference as occurring. In this case, the LTE module internally transmits information about the operating frequency and transmit power of the Wi-Fi module to the LTE module in step 602, in order to enable the LTE module to confirm information about IDC interference.

Subsequently, the LTE module confirms information about frequencies which may not be used due to IDC interference, that is, unusable frequencies, based on the information received from the Wi-Fi module and transmits information about the unusable frequencies to the BS in step 603.

Finally, the BS which receives the information about the unusable frequencies may use one or more of the methods of avoiding IDC interference, that is, FDM, TDM, LTE PC, etc. in step 604.

Figure 7:
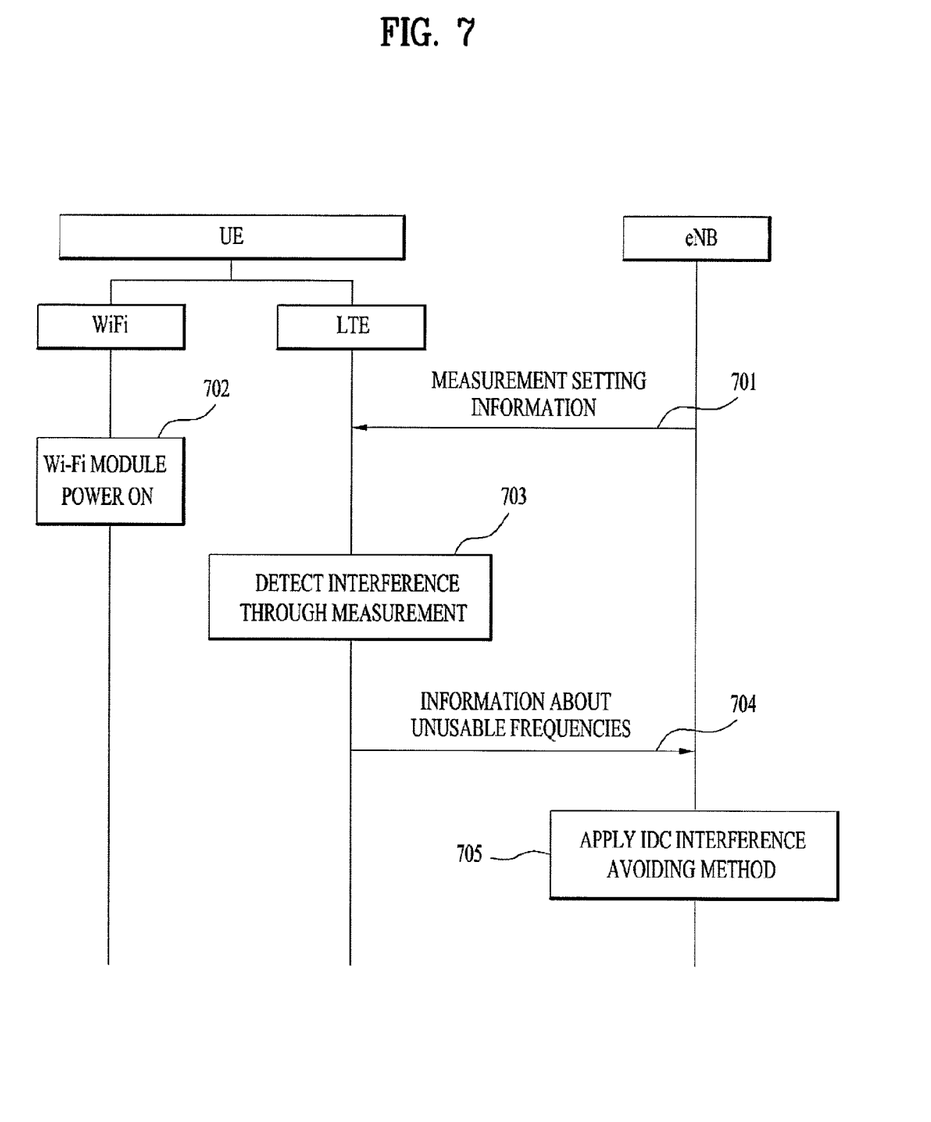
FIG. 7 is a flowchart illustrating another method of avoiding IDC interference according to a fourth embodiment of the present invention.

FIG. 7 is a flowchart illustrating another method of avoiding IDC interference according to a fourth embodiment of the present invention. In particular, in FIG. 7, assume that IDC interference can be detected through a measurement procedure of the LTE module.

First, the LTE module of the UE receives measurement configuration information from an eNB in step 701. If the Wi-Fi module is powered on in step 702 or if traffic occurs, the LTE module performs a measurement process based on the measurement configuration information in step 703 and regards IDC interference as occurring if interference of a predetermined threshold or more occurs or a signal strength of a specific threshold or less (e.g., SINR) is measured.

Subsequently, the LTE module transmits information about the unusable frequencies confirmed through the measurement process to the eNB in step 704 and, finally, the eNB which receives the information about the unusable frequencies may perform one or more of the methods of avoiding IDC interference, that is, at least of FDM, TDM, LTE PC, etc. in step 705.

In summary, according to the fourth embodiment of the present invention, when IDC interference occurs in a UE, the UE informs the eNB of information about the unusable frequencies such that the eNB rapidly performs FDM, TDM or LTE PC in order to avoid IDC interference occurring in the UE based on the information about the unusable frequencies received from the UE. Accordingly, it is possible to prevent from QoS being severely deteriorated in one UE due to IDC interference.

Figure 8:
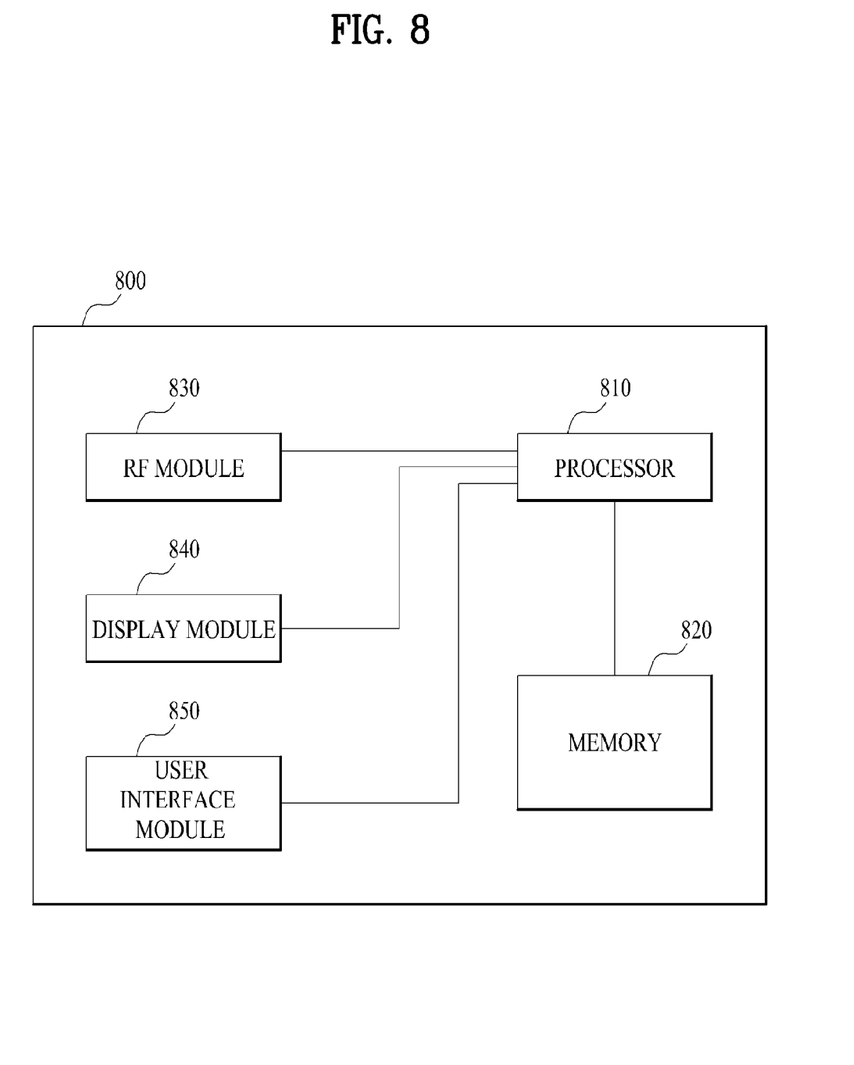
FIG. 8 is a block diagram of a communication apparatus according to an embodiment of the present invention.

FIG. 8 is a block diagram of a communication apparatus according to an embodiment of the present invention. The communication apparatus may be a part of an eNB or a UE.

Referring to FIG. 8, a communication apparatus 800 includes a processor 810, a memory 820, a Radio Frequency (RF) module 830, a display module 840 and a user interface module 850.

The communication apparatus 800 is shown for convenience of description and some modules thereof may be omitted. In addition, the communication apparatus 800 may further include necessary modules. In addition, some modules of the communication apparatus 800 may be subdivided. The processor 820 is configured to perform an operation of the embodiment of the present invention described with respect to the drawings.

More specifically, if the communication apparatus 800 is a part of an eNB, the processor 820 may generate and map a control signal to a control channel set within a plurality of frequency blocks. In addition, if the communication apparatus 800 is a part of a UE, the processor 820 may check a control channel thereof from a signal received from a plurality of frequency blocks and extract a control signal from the control channel.

Thereafter, the processor 820 may perform necessary operation based on the control signal. For a detailed description of the operation of the processor 820, reference may be made to the description associated with FIGS. 1 to 7.

The memory 820 is connected to the processor 810 so as to store an operating system, an application, program code, data and the like. The RF module 830 is connected to the processor 810 so as to perform a function for converting a baseband signal into a radio signal or converting a radio signal into a baseband signal. The RF module 830 performs analog conversion, amplification, filtering and frequency up-conversion or inverse processes thereof. The display module 840 is connected to the processor 810 so as to display a variety of information. As the display module 840, although not limited thereto, a well-known device such as a Liquid Crystal Display (LCD), a Light Emitting Diode (LED), or an Organic Light Emitting Diode (OLED) may be used. The user interface module 850 is connected to the processor 810 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

Although an example in which a method of avoiding IDC interference in a wireless communication system and an apparatus for the same is applied to a 3GPP LTE system is described, the present invention is applicable to various wireless communication systems in addition to the 3GPP LTE system.

The invention claimed is:

1. A method of communicating with a network of a mobile communication system by a user equipment (UE), the method comprising:
   receiving configuration information from the network by the UE; and
   upon detecting an in-device coexistence (IDC) condition by the UE according to the configuration information, initiating a transmission of information on the detected IDC condition to the network by the UE,
   wherein the information on the detected IDC condition comprises frequency information, and
   wherein the transmission of information on the detected IDC condition is initiated after the UE has failed to resolve the detected IDC condition on its own.

2. The method of claim 1, wherein the detected IDC condition is a detected IDC problem.

3. The method of claim 2, wherein the detected IDC problem is a detected IDC frequency interference between at least two devices within the UE.

4. The method of claim 1, wherein the detecting the IDC condition comprises detecting a change in the IDC condition.

5. The method of claim 3, wherein the IDC problem is detected while the UE is in a radio resource control (RRC) connected state.

6. The method of claim 2, wherein the information on the detected IDC condition comprises the frequency information and other information related to the detected IDC problem.

7. The method of claim 1, wherein the configuration information comprises one of IDC monitoring information and IDC reporting information.

8. The method of claim 1, wherein the frequency information includes frequency information about a corresponding measurement object.

9. The method of claim 3, wherein the at least two devices are at least two of a long term evolution (LTE) transceiver, a WiFi transceiver and a Bluetooth transceiver.

10. A method of communicating with a user equipment (UE) by a network of a mobile communication system, the method comprising:
    transmitting configuration information from the network to the UE; and
    upon a detection of an in-device coexistence (IDC) condition by the UE according to the configuration information, receiving information on the detected IDC condition from the UE,
    wherein the information on the detected IDC condition comprises frequency information, and
    wherein the information on the detected IDC condition is received from the UE after the UE has failed to resolve the detected IDC condition on its own.

11. The method of claim 10, wherein the detected IDC condition is a detected IDC problem.

12. The method of claim 11, wherein the detected IDC problem is a detected IDC frequency interference between at least two devices within the UE.

13. The method of claim 10, wherein the detected IDC condition comprises a detected change in the IDC condition.

14. The method of claim 12, where the IDC problem is detected while the UE is in a radio resource control (RRC) connected state.

15. The method of claim 11, wherein the information on the detected IDC condition comprises the frequency information and other information related to the detected IDC problem.

16. The method of claim 10, wherein the configuration information comprises one of IDC monitoring information and IDC reporting information.

17. The method of claim 10, wherein the frequency information includes frequency information about a corresponding measurement object.

18. The method of claim 12, wherein the at least two devices are at least two of a long term evolution (LTE) transceiver, a WiFi transceiver and a Bluetooth transceiver.

* * * * *